US009140451B2

(12) United States Patent
Haedicke et al.

(10) Patent No.: US 9,140,451 B2
(45) Date of Patent: Sep. 22, 2015

(54) GAS TAP COMPRISING AN ELECTROMAGNETIC SAFETY VALVE AND MAGNETIC INSERT FOR AN ELECTROMAGNETIC SAFETY VALVE

(75) Inventors: Joachim Haedicke, Baden-Baden (DE); Martin Oberhomburg, Wetter (DE); Gildas Violain, Ottrott (FR)

(73) Assignee: BSH Hausgeraete GmbH, Munich (DE)

( * ) Notice: Subject to any disclaimer, the term of this patent is extended or adjusted under 35 U.S.C. 154(b) by 2279 days.

(21) Appl. No.: 10/529,002

(22) PCT Filed: Sep. 22, 2003

(86) PCT No.: PCT/EP03/10530
§ 371 (c)(1),
(2), (4) Date: Dec. 15, 2005

(87) PCT Pub. No.: WO2004/031632
PCT Pub. Date: Apr. 15, 2004

(65) Prior Publication Data
US 2006/0138372 A1    Jun. 29, 2006

(30) Foreign Application Priority Data
Sep. 25, 2002    (EP) .................................... 02021405

(51) Int. Cl.
*F23N 1/00* (2006.01)
*F16K 31/08* (2006.01)
(52) U.S. Cl.
CPC .............. *F23N 1/005* (2013.01); *F16K 31/082* (2013.01)

(58) Field of Classification Search
CPC .............................. F23N 1/005; F16K 31/082
USPC ............... 251/129.15, 310, 129.04, 309, 207, 251/330; 137/65, 614.12, 614
See application file for complete search history.

(56) References Cited

U.S. PATENT DOCUMENTS

| 3,656,076 A | * | 4/1972 | Prouty et al. ................... 335/240 |
| 3,675,171 A | * | 7/1972 | Kirk ............................... 335/232 |
| 3,704,980 A | * | 12/1972 | Lokkart .......................... 431/43 |
| 3,739,465 A | * | 6/1973 | Romer et al. ..................... 29/596 |
| 3,762,639 A | * | 10/1973 | Katchka et al. ............... 236/15 A |

(Continued)

FOREIGN PATENT DOCUMENTS

| DE | 1 959 057 | 5/1971 |
| DE | 39 39 537 A1 | 6/1991 |

(Continued)

OTHER PUBLICATIONS

EP 1 063 474 A1, Dec. 27, 2000, International Search Report.

*Primary Examiner* — John K Fristoe, Jr.
*Assistant Examiner* — Andrew J Rost
(74) *Attorney, Agent, or Firm* — James E. Howard; Andre Pallapies

(57) ABSTRACT

A gas tap including a gas path includes an electromagnetic safety valve for closing the gas path is provided. The safety valve includes an armature housing and having a mobile magnetic anchor in the housing and a valve seat. The mobile magnetic anchor includes a valve closing element which presses on the valve seat to close the gas path and an electromagnetic coil for activating the mobile magnetic anchor and the valve closing element to close the gas path when voltage is applied to the electromagnetic coil. Also, the electromagnetic coil is arranged as a separate component outside of the armature housing on a magnetic insert.

13 Claims, 4 Drawing Sheets

(56) References Cited

U.S. PATENT DOCUMENTS

| | | | |
|---|---|---|---|
| 3,849,031 A * | 11/1974 | Charboneau et al. | 417/417 |
| 3,899,003 A * | 8/1975 | Tirelli | 137/625.65 |
| 3,945,399 A * | 3/1976 | Tirelli | 137/529 |
| 3,998,425 A * | 12/1976 | Braucksiek | 251/129.16 |
| 4,054,854 A * | 10/1977 | Marsden | 335/260 |
| 4,125,356 A * | 11/1978 | Ohashi et al. | 431/76 |
| 4,175,590 A * | 11/1979 | Grandclement | 137/883 |
| 4,262,877 A * | 4/1981 | Lang | 251/129.15 |
| 4,488,702 A * | 12/1984 | Lapeyre | 251/46 |
| 4,530,486 A * | 7/1985 | Rusnak | 251/129.17 |
| 4,614,993 A * | 9/1986 | Komura | 361/257 |
| 4,621,771 A * | 11/1986 | Chiba et al. | 239/585.4 |
| 4,697,608 A * | 10/1987 | Kolze et al. | 137/1 |
| 4,817,914 A * | 4/1989 | Pick et al. | 251/129.15 |
| 4,830,602 A * | 5/1989 | Kaselow | 431/80 |
| 4,954,799 A * | 9/1990 | Kumar | 335/236 |
| 5,113,896 A * | 5/1992 | Tortellier | 137/269 |
| 5,145,148 A * | 9/1992 | Laurent | 251/129.15 |
| 5,188,017 A * | 2/1993 | Grant et al. | 251/129.19 |
| 5,636,828 A * | 6/1997 | Brehm et al. | 251/129.15 |
| 5,845,672 A * | 12/1998 | Reuter et al. | 251/129.15 |
| 6,076,801 A * | 6/2000 | DuHack et al. | 251/129.15 |
| 6,225,886 B1 * | 5/2001 | Kleinert et al. | 251/129.15 |
| 6,322,049 B1 * | 11/2001 | Hofmann et al. | 251/129.15 |
| 6,352,428 B1 * | 3/2002 | Uribetxebarria et al. | 431/80 |
| 6,609,698 B1 | 8/2003 | Parsons et al. | |
| 6,637,669 B2 * | 10/2003 | Areso | 236/15 A |

FOREIGN PATENT DOCUMENTS

| | | |
|---|---|---|
| DE | 43 34 350 A1 | 4/1995 |
| EP | 1 036 987 A2 | 9/2000 |
| FR | 2 544 834 A1 | 10/1984 |
| JP | 58072784 A | 4/1983 |
| WO | WO 9937517 A1 * | 7/1999 |

* cited by examiner

GAS TAP COMPRISING AN ELECTROMAGNETIC SAFETY VALVE AND MAGNETIC INSERT FOR AN ELECTROMAGNETIC SAFETY VALVE

The present invention relates to a gas tap with an electromagnetic safety valve and a magnetic insert for an electromagnetic safety valve for inserting in the gas tap, which magnetic insert has a mobile armature in an armature housing arranged with a valve closing element and an electromagnetic coil. To close a gas path provided in the gas tap the magnetic anchor presses the valve-closing element onto a valve seat provided in the gas tap. When voltage is applied to the electromagnetic coil the magnetic anchor is actuated.

DE 1 959 057 discloses a generic magnetic insert in particular for monitoring devices on gas-heated units. The magnetic insert has an electromagnet mounted on a bearing plate and an armature plate, which is connected to a valve tappet. The valve tappet is displaceably mounted in a protective capsule enclosing the electromagnet and the armature plate. Attached to the end of the valve tappet opposite to the armature plate is the closing member of a shut-off valve. Comparable magnetic inserts are also known from EP 1 036 987 and EP 1 063 474.

The object of the present invention is to provide a gas tap with an electromagnetic safety valve or respectively a magnetic insert for the electromagnetic safety valve, whereof the service life is prolonged. Due to the external arrangement of the electromagnetic coil mechanical shock loads are no longer transferred directly from the magnetic anchor in the armature housing to the electromagnetic coil. The effect of such mechanical shock loads in known magnetic inserts with electromagnetic coils arranged inside the armature housing is that already after approximately 40,000 switching cycles electrical terminals of the electromagnetic coil tear. According to the present invention the number of switching cycles of the magnetic insert is clearly increased.

According to a particularly advantageous embodiment the electromagnetic coil can easily be disassembled on the magnetic insert and/or arranged gastight separately from the gas path in the gas tap. The electromagnetic coil can thus be exchanged problem-free as a wear-and-tear component, without gastight surfaces between the magnetic insert and the gas tap being damaged.

It is preferred if the electromagnetic coil is arranged outside the gas tap when the magnetic insert is inserted in the gas tap. This means that the electromagnetic coil can be exchanged without having to detach the magnetic insert from the gas tap.

The magnetic anchor of the magnetic insert can be extended beneficially to outside the gas tap. The extended magnetic anchor can be guided and moved more precisely in the armature housing and lower in clearance and/or friction. The wear on magnetic anchor guide sections in the armature housing is thereby reduced.

According to the type of two-point mounting the armature housing can have at least two magnetic anchor guide sections axially distanced from one another for guiding the magnetic anchor. This effectively further improves the precise and low-friction motion of the armature. It is particularly advantageous for good control of the magnetic anchor if both guide sections are made of different materials, metal and plastic in particular.

It is preferred for good adjustment movement of the magnetic anchor if the distance between both guide sections is as great as possible. This can be done according to the present invention if a first magnetic anchor guide section of the armature housing is provided inside the gas tap, and a second magnetic anchor guide section of the armature housing is formed outside the gas tap. The number of switching cycles of the magnetic insert can be increased to more than 100,000 in particular in combination with the abovementioned features.

A fixed counter-anchor can be arranged preferably in the armature housing to boost a magnetic force of the magnetic insert. The counter-anchor also serves to limit an armature stroke.

In process engineering terms it is preferred if the armature housing is made in two parts from a first armature housing section set in the gas tap and a second armature housing section projecting from the gas tap. This means that the second armature housing section is preferably connected gastight with the gas tap.

In process engineering terms it is particularly preferred if the first armature housing section of the magnetic insert arranged in the gas tap is structurally identical to corresponding housing sections of commercially available magnetic inserts. In this case the inventive magnetic insert can be, used in existing mass-produced gas taps, without any retrofitting of the gas taps.

All modifications of the inventive magnetic insert are provided, by comparison, on the second armature housing section outside the gas tap.

Two embodiments of the invention are described hereinbelow by means of the attached figures, in which.

Figure 1:
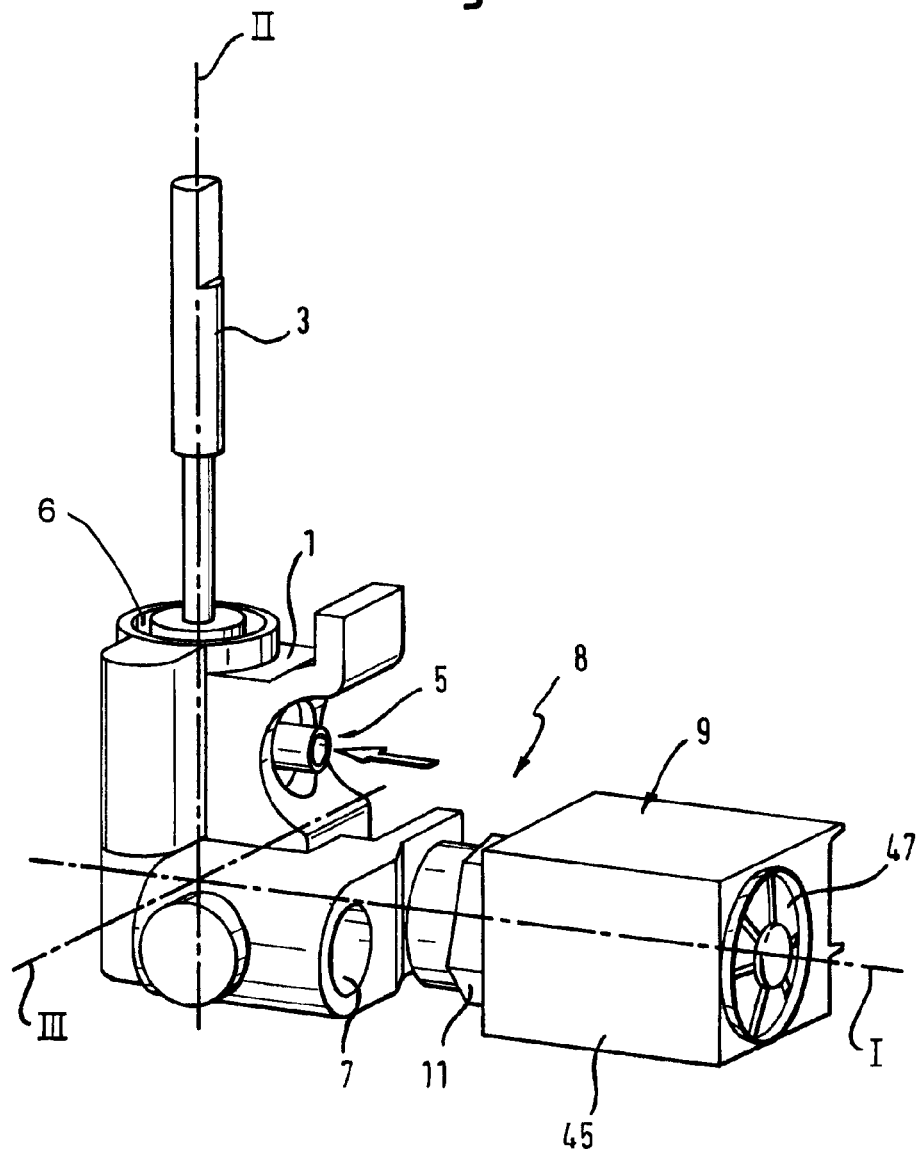
FIG. 1 is a perspective view of a gas tap with an electromagnetic safety valve according to the first embodiment.

FIG. 1 illustrates a conventional gas tap with a gas tap body 1. In the gas tap body 1 a tap axle 3 is pivotably mounted. A rotating knob, not illustrated, for actuating the gas tap is arranged on the upper free end of the tap axle 3. A gas inlet 5 of the gas tap body 1 can be connected to a gas supply, not illustrated. The gas inlet 5 is connected in terms of fluid technics via a gas path 6 evident in the following figures to a gas outlet 7. A gas flow in the gas path 6 runs along the arrows indicated in the figures. The gas tap shown in FIG. 1 has a safety valve 8 with a-magnetic insert 9. The magnetic insert 9 is screwed by means of a union nut 11 to the gas tap body 1.

Figure 2:
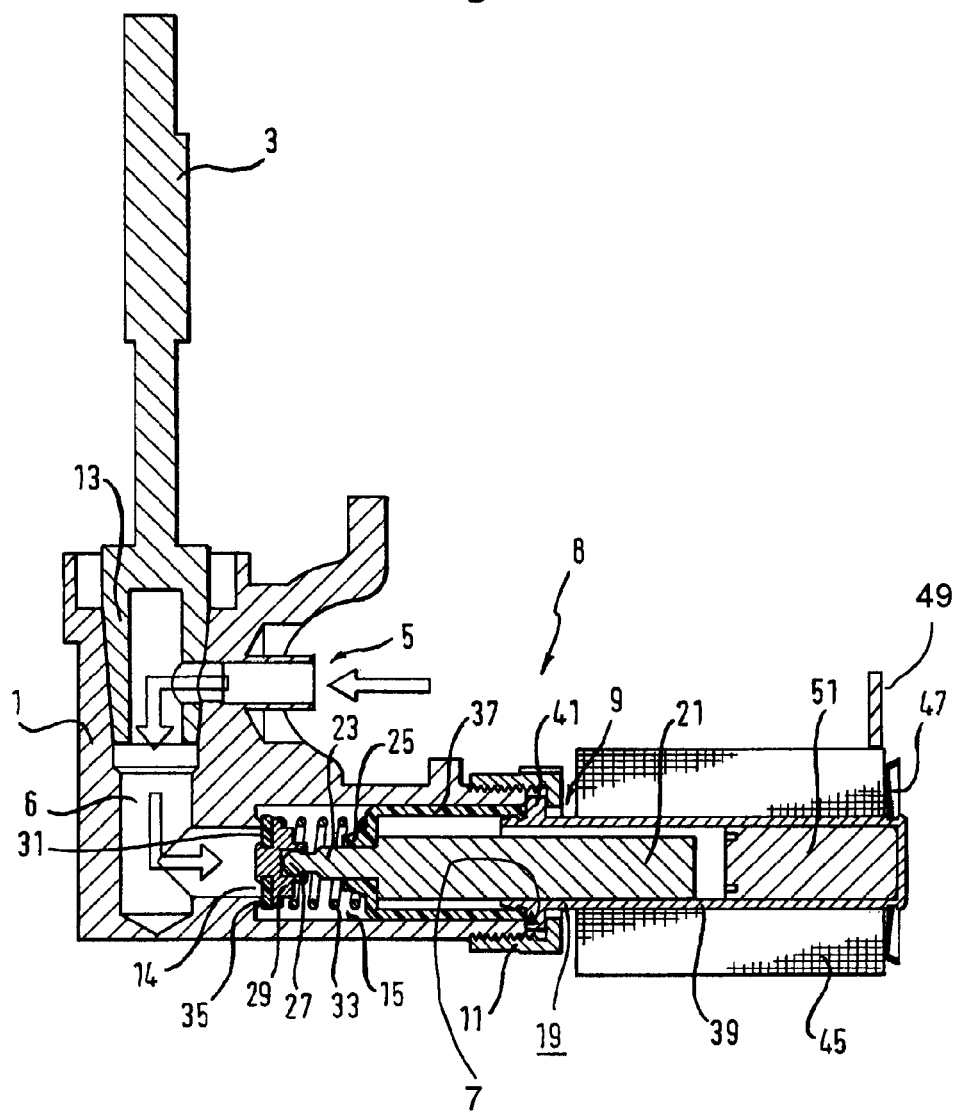
FIG. 2 is a sectional view of the gas tap of FIG. 1 along a plane through the lines I and II of FIG. 1.

According to FIG. 2 a cock plug 13, swivel-mounted in a conical section of the gas tap body 1, is designed in the lower end of the tap axle 3. Depending on the rotational position of the cock plug 13 the passage of gas is adjusted by the gas path 6. The latter terminates in a frontal opening 14 on a horizontal Take-up bore 15 of the gas tap. The gas path 6 runs on through an opening in the cylindrical inner wall of the Take-up bore 15 to the gas outlet 7. In the Take-up bore 15 is set the magnetic insert 9. The magnetic insert 9 has an armature housing 19, in which a magnetic anchor 21 is guided. Formed on the magnetic anchor 21 is a transfer tappet 23. This protrudes against the direction of gas flow through a sleeve-like magnetic anchor guide section 25 of the armature housing 19. The free end of the transfer tappet 23 is formed as a spherical head 27. A valve head 29 with a seal 31 is attached thereon as a valve-closing element. The valve head 29 is somewhat movable relative to the spherical head 27 of the transfer tappet 23. Errors in angle between the magnetic insert 9 and the gas tap body 1 are thus compensated. A helical spring 33, which presses on the valve head 29, is supported on the armature housing 19. In FIG. 2 the latter is pressed onto a valve seat 35 configured frontally in the Take-up bore 15, which encircles the frontal opening 14. As evident also from FIG. 3, the gas path 6 between the gas inlet 5 and the gas outlet 7 is closed.

Figure 3:
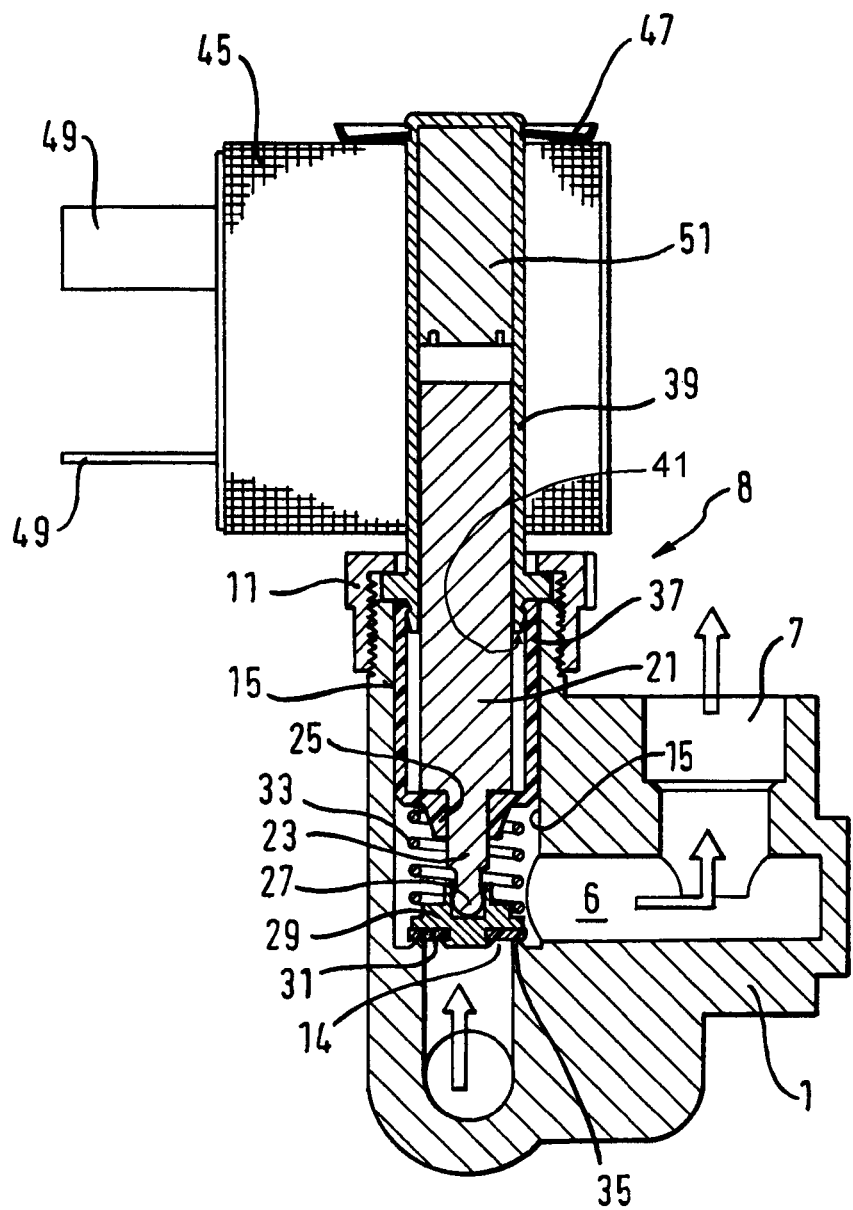
FIG. 3 is a sectional view of the gas tap of FIG. 1 along a plane through the lines I and III of FIG. 1.

FIGS. 2 and 3 disclose that the armature housing 19 is made in two parts from a cost-effective plastic housing part 37 and an armature guide sleeve 39 of metal. The plastic housing part 37 is sunk fully in the Take-up bore 15 of the gas tap body 1. An open end of the plastic housing part 37 lying opposite the sleeve-like guide section 25 is thrust onto an outer circumference of the armature guide sleeve 39. Here the plastic housing part 37 overlaps the armature guide sleeve 39 as far as a peripheral flange 41 of the armature guide sleeve 39. The peripheral flange 41 of the armature guide sleeve 39 is pressed gastight onto a frontal outer edge of the Take-up bore by means of the screwed-on union nut 11. The inner circumference of the armature guide sleeve 39 is in flat against the magnetic anchor 21. The inner circumference of the armature guide sleeve 39, as also the sleeve-like guide section 25, thus serves as a magnetic anchor guide section.

Mounted on the outer circumference of the armature guide sleeve 39 arranged outside the gas tap body 1 is an electromagnetic coil 45. To secure the electromagnetic coil 45 on the armature guide sleeve 39 a star wheel 47 is thrust onto the armature guide sleeve 39 at the front. The star wheel 47 is snap-locked in a peripheral groove of the armature guide sleeve 39. The electromagnetic coil 39 has electrical terminal contacts 49. These can be connected to an electrical fire-monitoring member, i.e. a thermoelement, or to an electronic control device for fully-automatic control of the safety valve 8. When there is a gas flame on a gas burner the thermoelement generates an electrical voltage, which is conveyed via the electric terminal contacts 49 to the electromagnetic coil 45 which it excites. A magnetic force is thereby applied to the magnetic anchor 21 against the spring force of the spring 33. The magnetic force brings the magnetic anchor 21 into an opened position, in which the valve head 29 is out of contact with the valve seat 35. If the flame should be extinguished during operation, the voltage and thus the magnetic force break down. The magnetic anchor 21 is thus pressed against the valve seat 35 by means of the spring force of the spring 33. When the flame is extinguished the gas path 6 in the gas tap is thus closed. A counter-anchor 51 is arranged fixed in the armature guide sleeve 39 to increase the magnetic force of the electromagnetic coil 45 acting on the magnetic anchor 21. The counter-anchor 51 serves simultaneously to limit an opening stroke path of the magnetic anchor 21.

Figure 4:
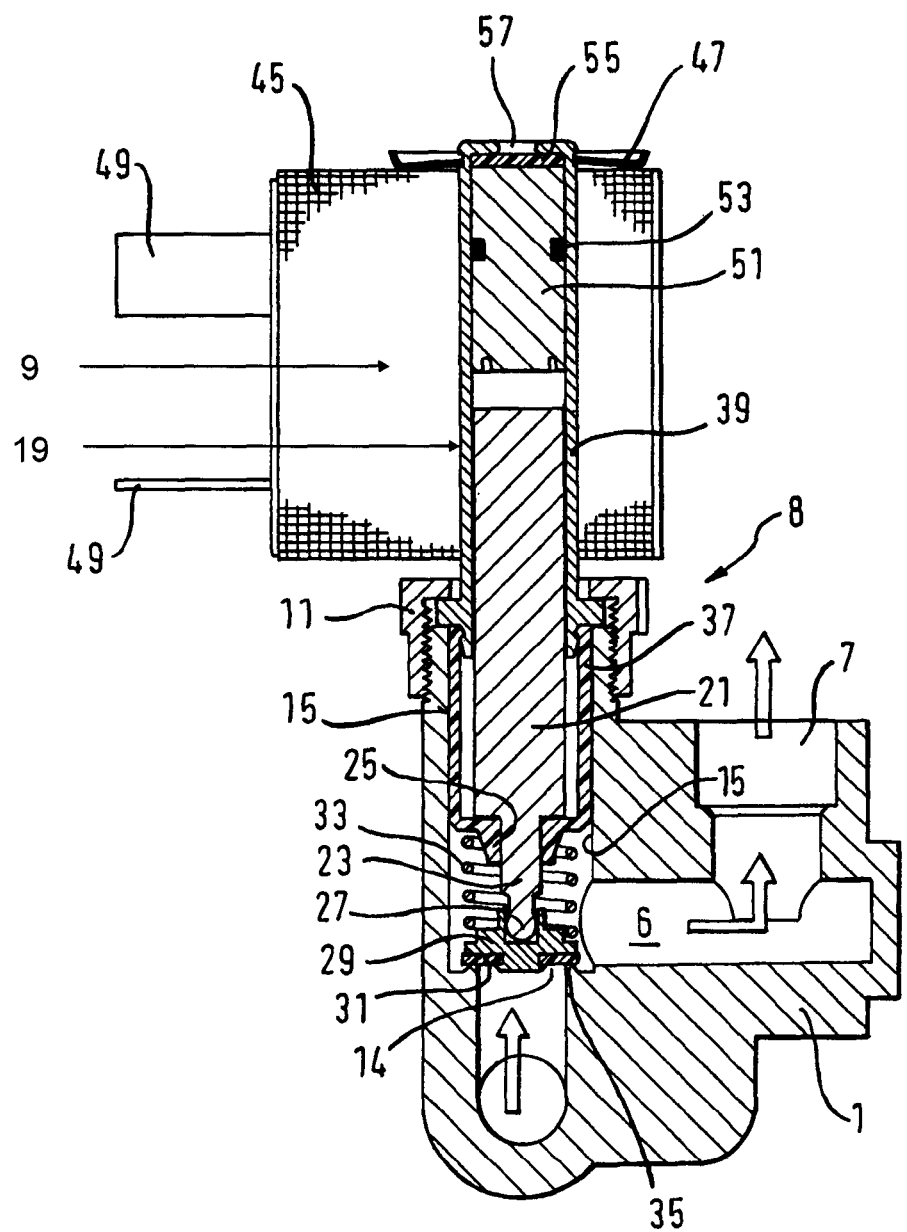
FIG. 4 is a sectional view of a gas tap corresponding to FIG. 3 according to the second embodiment.

FIG. 4 illustrates a magnetic insert 9 according to the second embodiment. Structure and function of the magnetic insert 9 are identical to the magnetic insert 9 of the first embodiment with the exception that a damping system for damping impacts of the magnetic anchor 21 on the counter-anchor 51 is additionally provided in the magnetic insert 9, as in FIG. 4. The damping system has an O-ring 53 set into the outer circumference of the counter-anchor 51. The O-ring 53 is pressed in between the inner circumference of the armature guide sleeve 39 and the counter-anchor 51 and enables fixed mounting of the counter-anchor 51. At the same time the armature housing 19 is closed off gastight to the exterior. In addition, an attenuation disc 55 made of silicon material is added to damp the shocks exerted onto the counter-anchor 51 between the upper front side of the armature guide sleeve 39 and the counter-anchor 51. The upper front side of the armature guide sleeve 39 can, owing to the gastight seal via the O-ring 53, be designed with an opening 57 advantageous in process engineering terms, as shown in FIG. 4.

The invention claimed is:

1. A gas tap including a gas path, comprising:
   an electromagnetic safety valve for closing the gas path;
   said safety valve including an armature housing and having a mobile magnetic anchor in said housing;
   a valve seat;
   said mobile magnetic anchor including a valve closing element which presses on said valve seat to close said gas path;
   at least two magnetic anchor guide sections positioned and axially spaced apart in said armature housing to guide said magnetic anchor, said at least two magnetic anchor guide sections being made from different materials, a first one of said two magnetic anchor guide sections being made from metal and a second one of said two magnetic anchor guide sections being made from a plastic material, wherein each of said at least two magnetic anchor guide sections is a separate and independent component;
   an electromagnetic coil for activating said mobile magnetic anchor and valve closing element to open said gas path when voltage is applied to said electromagnetic coil;
   said electromagnetic coil arranged as a separate component outside of said armature housing on a magnetic insert; and
   a counter-anchor arranged in said armature housing to at least one of strengthen the magnetic force of said magnetic insert and limit the armature stroke path.

2. The gas tap according to claim 1, including said electromagnetic coil arranged gastight separately from said gas path.

3. The gas tap according to claim 1, including said electromagnetic coil is attached on the outside of said armature housing of said magnetic insert to easily detach therefrom.

4. The gas tap according to claim 1, including said electromagnetic coil is arranged on the outside of the gas tap.

5. The gas tap according to claim 1, including said magnetic anchor of said magnetic insert protrudes at least partially outside of the gas tap.

6. The gas tap according to claim 1, wherein one of said two magnetic anchor guide sections is positioned inside of the gas tap and the other of said two magnetic anchor guide sections is positioned outside of the gas tap.

7. The gas tap according to claim 1, including said armature housing formed in two separate parts, with a first armature housing section set in the gas tap and a second armature housing section projecting from the gas tap.

8. A gas tap including a gas path, comprising:
   an electromagnetic safety valve for closing the gas path;
   said safety valve including an armature housing and having a mobile magnetic anchor in said housing, said armature housing formed in two separate parts, with a first armature housing section set in the gas tap and a second armature housing section projecting from the gas tap;
   a valve seat;
   said mobile magnetic anchor including a valve closing element which presses on said valve seat to close said gas path;
   at least two magnetic anchor guide sections positioned and axially spaced apart in said armature housing to guide said magnetic anchor, said at least two magnetic anchor guide sections being made from different materials, a first one of said two magnetic anchor guide sections being made from metal and a second one of said two magnetic anchor guide sections being made from a plastic material, wherein each of said at least two magnetic anchor guide sections is a separate and independent component;

an electromagnetic coil for activating said mobile magnetic anchor and valve closing element to open said gas path when voltage is applied to said electromagnetic coil;

said electromagnetic coil arranged as a separate component outside of said armature housing on a magnetic insert; and a counter-anchor arranged in said armature housing to strengthen the magnetic force of said magnetic insert, to limit the armature stroke path or to both strengthen the magnetic force of said magnetic insert and limit the armature stroke path and at least one of said electromagnetic coil, one of said armature housing sections and said counter-anchor are provided on said second armature housing section projecting from the gas tap.

9. A magnetic insert for an electromagnetic safety valve for inserting into a gas tap including a gas path, the magnetic insert comprising:

an armature housing and having a mobile magnetic anchor in said housing;

a valve seat;

said mobile magnetic anchor including a valve closing element which presses on said valve seat to close the gas path;

at least two magnetic anchor guide sections positioned and axially spaced apart in said armature housing to guide said magnetic anchor, said at least two magnetic anchor guide sections being made from different materials, a first one of said two magnetic anchor guide sections being made from metal and a second one of said two magnetic anchor guide sections being made from a plastic material, wherein each of said at least two magnetic anchor guide sections is a separate and independent component, and wherein all of the at least two magnetic anchor guide sections directly guide the magnetic anchor;

an electromagnetic coil for activating said mobile magnetic anchor and valve closing element to open said gas path when voltage is applied to said electromagnetic coil; and said electromagnetic coil arranged as a separate component outside of said armature housing on the magnetic insert.

10. A gas tap including a gas path, comprising:

an electromagnetic safety valve for closing the gas path;

said safety valve including an armature housing and having a mobile magnetic anchor in said housing;

a valve seat;

said mobile magnetic anchor including a valve closing element which presses on said valve seat to close said gas path;

at least two magnetic anchor guide sections positioned and axially spaced apart in said armature housing to guide said magnetic anchor, said at least two magnetic anchor guide sections being made from different materials, a first one of said two magnetic anchor guide sections being made from metal and a second one of said two magnetic anchor guide sections being made from a plastic material, wherein each of said at least two magnetic anchor guide sections is a separate and independent component;

an electromagnetic coil for activating said mobile magnetic anchor and valve closing element to open said gas path when voltage is applied to said electromagnetic coil;

said electromagnetic coil arranged as a separate component outside of said armature housing on a magnetic insert; and a tap axle and the gas flow path includes a gas inlet upstream of the valve seat relative to the direction of flow of gas, the tap axle being disposable between a closing disposition in which the tap axle prevents a flow of gas between the gas inlet and the valve seat and an open disposition in which the tap axle permits a flow of gas between the gas inlet and the valve seat.

11. The gas tap according to claim 10, including the tap axle is pivotable between its closing disposition and its open disposition.

12. A gas tap including a gas path, comprising:

an electromagnetic safety valve for closing the gas path;

said safety valve including an armature housing and having a mobile magnetic anchor in said housing;

a valve seat;

said mobile magnetic anchor including a valve closing element which presses on said valve seat to close said gas path;

at least two magnetic anchor guide sections positioned and axially spaced apart in said armature housing to guide said magnetic anchor, said at least two magnetic anchor guide sections being made from different materials, a first one of said two magnetic anchor guide sections being made from metal and a second one of said two magnetic anchor guide sections being made from a plastic material, wherein each of said at least two magnetic anchor guide sections is a separate and independent component, and wherein both of the magnetic anchor guide sections directly guide the magnetic anchor;

an electromagnetic coil for activating said mobile magnetic anchor and valve closing element to open said gas path when voltage is applied to said electromagnetic coil; and said electromagnetic coil arranged as a separate component outside of said armature housing on a magnetic insert.

13. A gas tap including a gas path, comprising:

an electromagnetic safety valve for closing the gas path;

said safety valve including an armature housing and having a mobile magnetic anchor in said housing;

a valve seat;

said mobile magnetic anchor including a valve closing element which presses on said valve seat to close said gas path;

at least two magnetic anchor guide sections positioned and axially spaced apart in said armature housing to guide said magnetic anchor, said at least two magnetic anchor guide sections being made from different materials, a first one of said two magnetic anchor guide sections being made from metal and a second one of said two magnetic anchor guide sections being made from a plastic material, wherein each of said at least two magnetic anchor guide sections is a separate and independent component, and wherein all of the at least two magnetic anchor guide sections directly guide the magnetic anchor; and an electromagnetic coil for activating said mobile magnetic anchor and valve closing element to open said gas path when voltage is applied to said electromagnetic coil, wherein said electromagnetic coil is mounted as a separate component on an outer circumference of the first magnetic anchor guide section.

* * * * *